(12) United States Patent
Kolbush

(10) Patent No.: US 10,353,585 B2
(45) Date of Patent: Jul. 16, 2019

(54) METHODS FOR MANAGING ARRAY LUNS IN A STORAGE NETWORK WITH A MULTI-PATH CONFIGURATION AND DEVICES THEREOF

(71) Applicant: NetApp, Inc., Sunnyvale, CA (US)

(72) Inventor: Richard Kolbush, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 488 days.

(21) Appl. No.: 15/043,928

(22) Filed: Feb. 15, 2016

(65) Prior Publication Data

US 2017/0235494 A1 Aug. 17, 2017

(51) Int. Cl.
| | |
|---|---|
| G06F 13/12 | (2006.01) |
| G06F 3/06 | (2006.01) |
| G06F 13/42 | (2006.01) |

(52) U.S. Cl.
CPC .......... G06F 3/0607 (2013.01); G06F 3/0604 (2013.01); G06F 3/067 (2013.01); G06F 3/0629 (2013.01); G06F 3/0632 (2013.01); G06F 3/0665 (2013.01); G06F 3/0689 (2013.01); G06F 13/426 (2013.01)

(58) Field of Classification Search
CPC ..... H04L 67/1097; H04L 69/16; H04L 29/06; G06F 3/0607
USPC .......................................................... 710/313
See application file for complete search history.

(56) References Cited

U.S. PATENT DOCUMENTS

| | | | | |
|---|---|---|---|---|
| 8,838,892 | B2 * | 9/2014 | Li | G06F 3/061 |
| | | | | 711/114 |
| 8,930,537 | B2 * | 1/2015 | Basham | G06F 3/0605 |
| | | | | 709/226 |
| 2011/0252354 | A1 * | 10/2011 | Mimatsu | G06F 3/0607 |
| | | | | 715/771 |
| 2012/0059991 | A1 | 3/2012 | Cuddihy et al. | |
| 2012/0254462 | A1 * | 10/2012 | Sengupta | G06F 11/2071 |
| | | | | 709/238 |
| 2012/0311222 | A1 | 12/2012 | Bowles et al. | |
| 2012/0317357 | A1 * | 12/2012 | Kopylovitz | G06F 3/0607 |
| | | | | 711/114 |
| 2013/0007410 | A1 * | 1/2013 | Kopylovitz | G06F 3/061 |
| | | | | 711/209 |
| 2014/0002922 | A1 | 1/2014 | Bandic et al. | |

OTHER PUBLICATIONS

European Search Report and Written Opinion of Corresponding European Patent Application No. PCT/US2017/017179, 10 pgs, dated May 18, 2017.

* cited by examiner

*Primary Examiner* — Titus Wong
(74) *Attorney, Agent, or Firm* — Pepper Hamilton LLP (57) ABSTRACT

Methods, non-transitory computer readable media, and storage management computing devices that obtains and stores a plurality of LUN ranges and an indication of a plurality of ports of a bridge device corresponding to the plurality of LUN ranges. A LUN is received from the bridge device. One of the plurality of ports of the bridge device to which a storage device associated with the received LUN is attached via inclusion in one of a plurality of stacks communicably coupled to the one of the plurality of ports of the bridge device is identified. The received LUN is within one of the plurality of LUN ranges corresponding to the one of the plurality of ports. An action is initiated based on the identified one of the plurality of ports of the bridge.

18 Claims, 5 Drawing Sheets

METHODS FOR MANAGING ARRAY LUNS IN A STORAGE NETWORK WITH A MULTI-PATH CONFIGURATION AND DEVICES THEREOF

FIELD

This technology relates to data storage networks, and more particularly to methods and devices for managing array logical unit number (LUNs) in storage networks with a multi-path configuration.

BACKGROUND

Storage networks are increasingly utilized to store large amounts of data for enterprises. In order to optimize the storage of data, and provide efficient service for storage operations for clients, data storage networks can incorporate storage management computing devices. Storage management computing devices can run an operating system that is optimized for storing data in a data storage network and for performing storage operations on the stored data. Storage networks in data centers generally include storage management and data storage devices, among others, that communicate across varying distances. For this and other reasons, various protocols are used within storage networks, and bridge devices are provided to perform translations and routing, among other functions.

For example, a storage management computing device can communicate with a bridge device using a fibre channel (FC) protocol and FC link that facilitates communications over relatively long distances. The bridge device then communicates with stacks that hold shelves of storage devices (e.g., disks) using a serial attached small computer system interface (SCSI) (SAS) and SAS link optimized for communication over relatively short distances. Accordingly, the bridge device in this example translates and routs FC messages received from a storage management computing device via an FC port to storage devices in stacks that are each connected to an SAS port of the bridge device.

The FC messages can be requests to perform storage operations and can include a logical unit number (LUN) that is associated with one of the storage devices in a shelf of one of the stacks communicably coupled to the bridge device via one of the SAS ports. Accordingly, upon receipt, the bridge device knows where to access data in order to implement the storage operation of an FC message based on a LUN included in the FC message.

Currently, bridge device assign LUNs sequentially as storage devices are connected or come online, and report the LUNs to storage management computing devices. Based on the reporting, a storage management computing device learns that a new storage device is available to provide storage functionality. Bridge devices are also configured to monitor failure of storage devices and to report a failure of a storage device to storage management computing devices by sending the LUN number of the failed storage device via an FC link, for example.

As LUNs are currently assigned sequentially by bridge devices, storage management computing devices are unable to determine the port of a bridge device that a storage device is attached (e.g., via inclusion in a stack coupled to the port), which can be useful information in many contexts. In one particular example, storage management computing devices cannot provide information (e.g., an indication of a stack) that would allow a technician to efficiently locate a failed storage device, resulting in increased time to address the failure of the storage device and reduced performance of the storage network for client devices.

DETAILED DESCRIPTION

Figure 1:
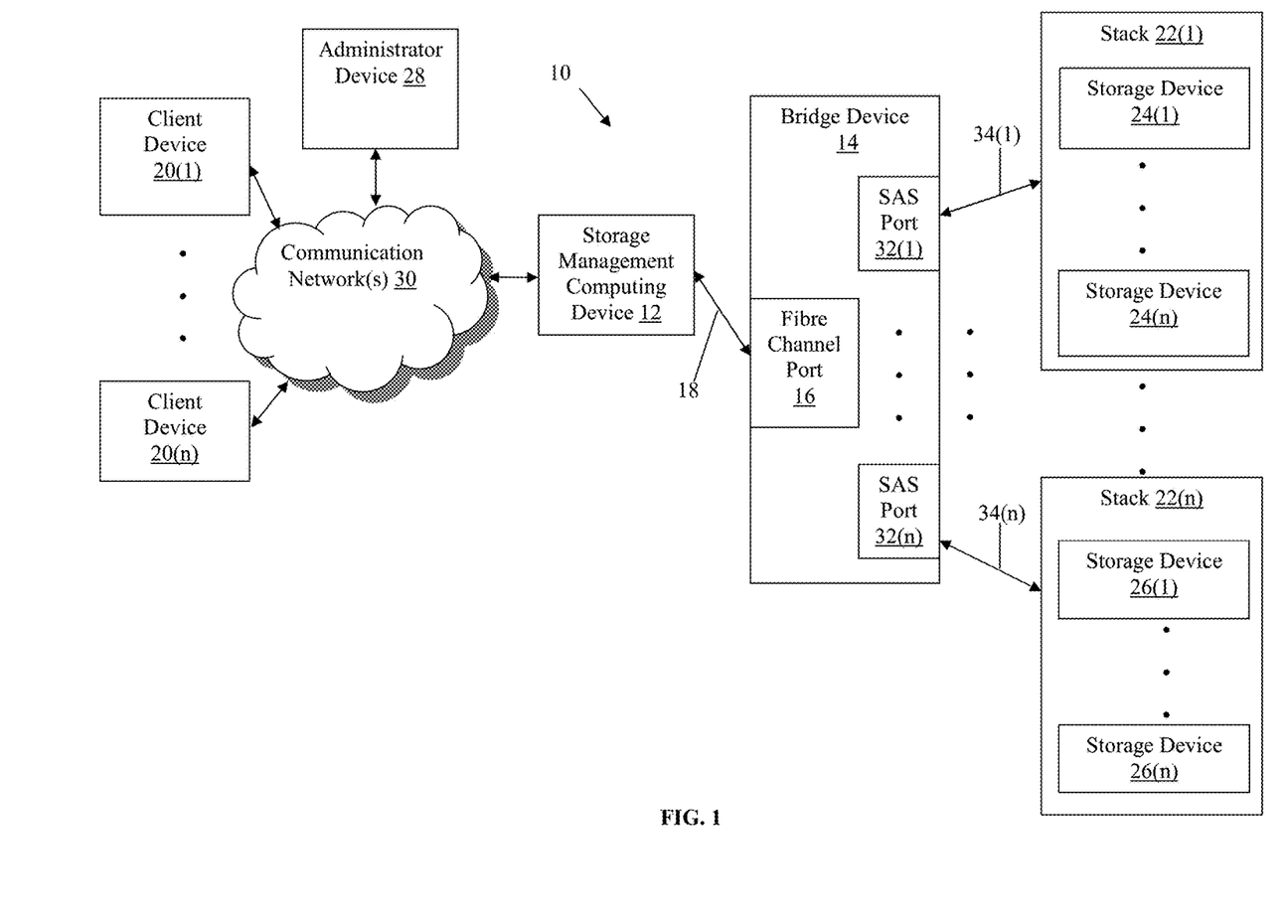
FIG. 1 is a block diagram of a network environment with an exemplary storage management computing device coupled to a bridge device.

An exemplary storage network 10 including an exemplary storage management computing device 12 coupled to a bridge device 14 at a fibre channel (FC) port 16 of the bridge device 14 and via an FC link 18 is illustrated in FIG. 1. The storage network 10 in this example further includes client devices 20(1)-20(n), stacks 22(1)-22(n) hosting storage devices 24(1)-24(n) and 26(1)-16(n), and an optional administrator device 28, although this storage network 10 can include other numbers and types of systems, devices, components, and/or elements in other configurations. The client devices 20(1)-20(n) communicate with the storage management computing device 12 via communication network(s) 30 and the bridge device 14 is coupled to the stacks 22(1)-22(n) and 24(1)-24(n) at serial attached small computer system interface (SCSI) (SAS) ports 32(1)-32(n) and via SAS links 34(1)-34(n) to provide a multi-path configuration in this example. This technology provides a number of advantages including methods, non-transitory computer readable media, and storage management computing devices that more efficiently manage array LUNs in a storage network with a multi-path configuration.

The storage management computing device 12 in this particular example is configured to store, retrieve, and/or manage files or other units of data stored by the storage devices 24(1)-24(n) and 26(1)-26(n). Accordingly, the storage management computing device 12 manages and provisions storage volumes, provides high availability for the data stored therein, and receives and responds to various read and write requests from the client devices 20(1)-20(n) directed to data stored in, or to be stored in, one or more of the storage volumes of the storage devices 24(1)-24(n) and 26(1)-26(n).

Figure 2:
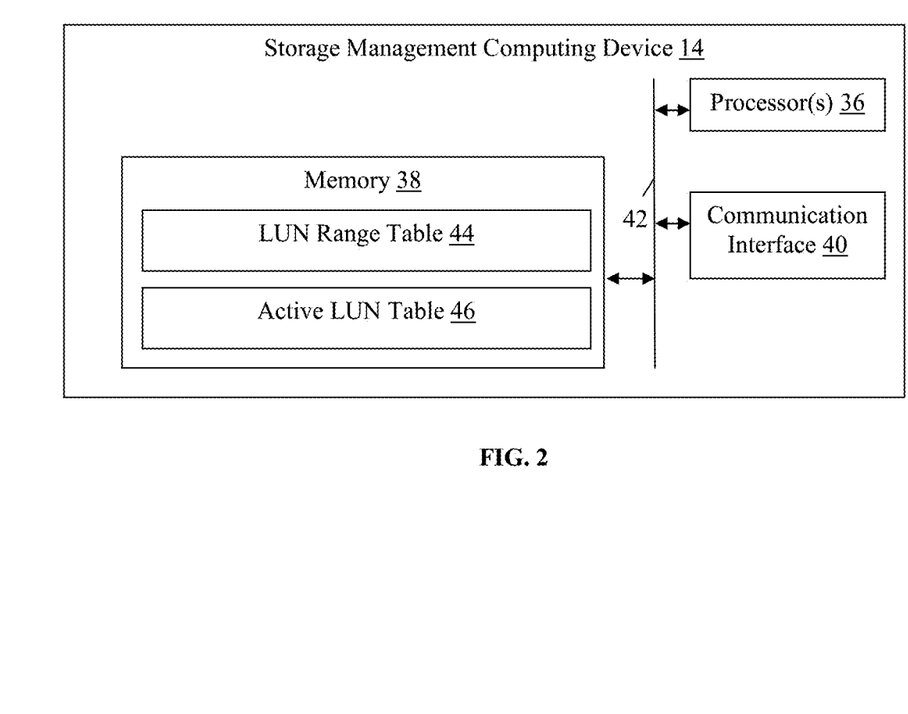
FIG. 2 is a block diagram of the exemplary storage management computing device of FIG. 1.

Referring to FIG. 2, a block diagram of the exemplary storage management computing device 12 is illustrated. In this example, the storage management computing device 12 includes processor(s) 26, a memory 38, and a communication interface 40, which are coupled together by a bus 42 or other communication link.

The processor(s) 36 of the storage management computing device 12 execute a program of instructions stored in the memory 38 for one or more aspects of the this technology, as described and illustrated by way of the embodiments herein, although the processor(s) 36 could execute other numbers and types of programmed instructions. The processor(s) 36 in the storage management computing device 12 may include one or more central processing units (CPUs) or general purpose processors with one or more processing cores, for example.

The memory 38 of the storage management computing device 12 may include any of various forms of read only memory (ROM), random access memory (RAM), flash memory, non-volatile or volatile memory, or the like, or a combination of such devices, for example. In this particular example, the memory includes a logical unit number (LUN) range table 44 and an active LUN table 46, although other types of tables, databases, applications, or modules can also be included in other examples.

The LUN range table in this example stores LUN ranges that are established as corresponding to SAS ports 32(1)-32(n). The LUNs are each associated with storage devices 24(1)-24(n) and 26(1)-26(n), although the LUNs could be associated with other types of storage entities in other examples. In this example, a corresponding LUN range table is maintained by the bridge device 14, and used by the bridge device 14 to assign LUNs when storage devices 24(1)-24(n) and 26(1)-26(n) are connected or come online.

Accordingly, the storage management computing device 12 and the bridge device 14 are preconfigured to store an indication of the LUN ranges that are available to be allocated to storage devices 24(1)-24(n) and 26(1)-26(n) and that are associated with each of the SAS ports 32(1)-32(n). For example, LUN ranges 0-499 and 500-99 may be established as corresponding to SAS port 32(1) and 32(n), respectively. In other examples, different LUN ranges can be used and the number of LUNs in the LUN range for one or more of the SAS ports 32(1)-32(n) can be the same or different than that of one or more other of the SAS ports 32(1)-32(n).

The active LUN table 46 in this example stores the LUNs within the established LUN ranges that correspond to those of the storage devices 24(1)-24(n) and 26(1)-26(n) that are currently online or connected and available to provide storage functionality. The LUNs stored in the active LUN table 46 are communicated via connection message to the storage management computing devices 12 from the bridge device 14, as described and illustrated in more detail later. Accordingly, the storage management computing device 12 can use the active LUN table 46 to determine which LUNs are available for performing storage functions.

The communication interface 40 of the storage management computing device 12 in this example can include one or more network interface controllers (NICs) for operatively coupling and communicating between the storage management computing device 12, the client devices 20(1)-20(n), and the administrator device 28, which are coupled together by the communication network(s) 30, and between the storage management computing device 12 and the bridge device 14, which are coupled together by the FC link 18, although other types and numbers of communication networks or systems with other types and numbers of connections and configurations to other devices and elements also can be used.

By way of example only, the communication network(s) 30 can use TCP/IP over Ethernet and industry-standard protocols, including NFS, CIFS, SOAP, XML, LDAP, and SNMP, although other types and numbers of communication networks, can be used. The communication network(s) 30 in this example may employ any suitable interface mechanisms and network communication technologies including, for example, Ethernet-based Packet Data Networks (PDNs) and the like. The communication network(s) 30 may also comprise any local area network and/or wide area network (e.g., Internet), although any other type of traffic network topologies may be used.

Referring back to FIG. 1, the bridge device 14 in this particular example is configured to manage and monitor direct attached storage, including the storage devices 24(1)-24(n) and 26(1)-26(n), as well as extend FC storage area network capabilities to SAS storage. The bridge device 14 in this example includes processor(s), a memory, and a communication interface, which are coupled together by a bus or other communication link, although the bridge device 14 can have other types and numbers of components.

The processor(s) of the bridge device 14 can execute a program of instructions stored in the memory of the bridge device for one or more aspects of the this technology, as described and illustrated by way of the embodiments herein, although the processor(s) could execute other numbers and types of programmed instructions. The processor(s) in the storage management computing device 12 may include one or more central processing units (CPUs) or general purpose processors with one or more processing cores, for example.

The memory of the bridge device 14 can include any of various forms of ROM, RAM, flash memory, non-volatile or volatile memory, or the like, or a combination of such devices, for example. In this example, the memory includes a LUN allocation table, although other types of tables, databases, applications, or modules can also be included in other examples.

The LUN allocation table in this example stores LUN ranges and associated SAS ports 32(1)-32(n) that correspond with the contents of the LUN range table 44 stored in the memory 38 of the storage management computing device 12, as well as unused LUNs in the associated LUN range for each of the SAS ports 32(1)-32(n). By allocating LUNs according to preconfigured LUN ranges shared by the storage management computing device 12, the storage management computing device can advantageously determine which of the SAS ports 32(1)-32(n) any one of the storage devices 24(1)-24(n) and 26(1)-26(n) is connected, as described and illustrated in more detail later.

The communication interface of the bridge device 14 is configured to communicate with the storage management computing device via an FC port 16 and FC link 18 and with the stacks 22(1)-22(n) via SAS ports 32(1)-32(n) and SAS links 34(1)-34(n). Accordingly, the communication interface of the bridge device facilitates communication of the storage management computing device 12 with storage devices 24(1)-24(n) and 26(1)-26(n) hosted by the stacks 22(1)-22(n) in a multipath configuration, with the various links 18 and 34(1)-34(n) having different associated protocols. While FC and SAS protocols are used in this example, any other protocols can be used for the links 18 and/or 34(1)-34(n).

The stacks 22(1)-22(n) are coupled to the SAS ports 32(1)-32(n) via SAS links 34(1)-34(n) in this example and are configured to host the storage devices 24(1)-24(n) and 26(1)-26(n). The stacks 22(1)-22(n) can include shelves in which the storage devices 24(1)-24(n) and 26(1)-26(n) are mounted as well as cabling and other connection infrastructure, for example. The storage devices 24(1)-24(n) and 26(1)-26(n) can be hard disk drives, solid state drives, flash memory, optical disk-based storage or any other type of storage suitable for storing files or objects in storage volumes for short or long term retention, for example.

Each of the storage devices 24(1)-24(n) and 26(1)-26(n) that is currently active/online is allocated a LUN by the bridge device 14, which is reported to the storage management computing device 12. The currently-allocated LUNs are then used by the storage management computing device 12 to provide storage services on behalf of the client devices 20(1)-20(n) using the storage devices 24(1)-24(n) and 26(1)-26(n), as described and illustrated in more detail later.

Each of the client devices 20(1)-20(n) in this example includes a processor, a memory, and a communication interface, and optionally includes an input device and/or a display device, which are coupled together by a bus or other link, although each of the client devices 20(1)-20(n) can have other types and numbers of components or other elements.

The client devices 20(1)-20(n) may run interface applications that provide an interface to make requests for and send content and/or data to the storage management computing device 12 via the communication network(s) 30, for example. Each of the client devices 20(1)-20(n) may be, for example, a conventional personal computer, a smart phone, a virtual machine running in a cloud, an application server hosting applications that utilize backend storage, or other processing and/or computing device, for example.

The administrator device 28 in this example is used by a storage administrator to establish and change configuration settings or policies for the storage network 10, as maintained or implemented by the storage management computing device 12. Accordingly, the administrator device 28 can optionally be used to populate the LUN range table 44 based on the pre-configuration of the bridge device 14 in some examples, as described and illustrated in more detail later.

The administrator device 28 can include a processor, a memory, a communication interface, an input device, and a display device, which are coupled together by a bus or other communication link, although the administrator device 28 can also have other types and numbers of components. The administrator device 28 can be a conventional personal computer or any other type computing device capable of communicating via the communication network(s) 30 with the storage management computing device 12

Although examples of the storage management computing device 12, bridge device 14, client devices 20(1)-20(n), stacks 22(1)-22(n), and administrator device 28, are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
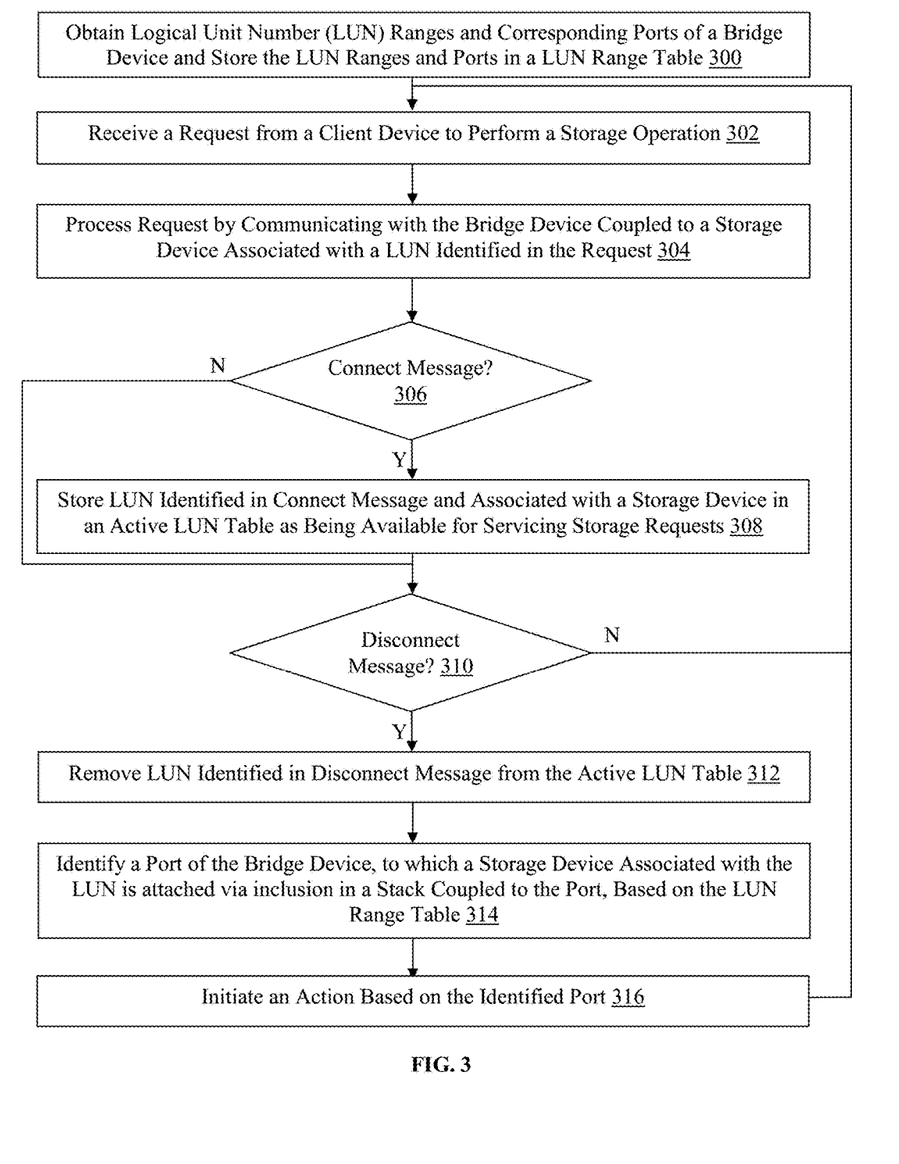
FIG. 3 is a flowchart of an exemplary method for interfacing, by the exemplary storage management computing device of FIGS. 1 and 2, with a bridge device to manage array LUNs in a storage network with a multi-path configuration.

An exemplary method for managing array LUNs in a storage network with a multi-path configuration will now be described with reference to FIGS. 1-5. Referring more specifically to FIG. 3, an exemplary method for interfacing, by the storage management computing device 12, with the bridge device 14 to manage array LUNs in the storage network 10 with the multi-path configuration of stacks 22(1)-22(n) is illustrated. In step 300 in this example, the storage management computing device 12 obtains LUN ranges and corresponding SAS ports 32(1)-32(n) of the bridge device 14, and stores each of the LUN ranges as associated with one of the SAS ports 32(1)-32(n) in the LUN range table 44. Optionally, a correspondence of each of the stacks 22(1)-22(n) with each of the SAS ports 32(1)-32(n) is also obtained by the storage management computing device 12 in step 300, and stored in the LUN range table 44.

In one example, the bridge device 14 and the storage management computing device 12 are pre-configured to store the associations of the LUN ranges and the SAS ports 32(1)-32(n). For example, a manufacturer of the bridge device 14 and/or the storage management computing device 12 may store the LUN ranges in a non-volatile memory as associated with each of the SAS ports 32(1)-32(n). In another example, the bridge device 14 can communicate the pre-configured associations of the LUN ranges and the SAS ports 32(1)-32(n) to the storage management computing device 12 via the FC link 18, such as upon initialization or in response to a request from the storage management computing device 12. Optionally, an administrator can also use the administrator device 28 to populate the LUN range table 44 based on a known pre-configuration of the bridge device 14.

Accordingly, one or more of the LUN ranges can be static or one or more of the LUN ranges can be dynamically established during runtime by one or both of the bridge device 14 or the storage management computing device 12. In examples in which the LUN ranges are dynamic, the storage management computing device 12 can receive an updated LUN range for one of the SAS ports 32(1)-32(n) from the bridge device 14 and can store the updated LUN range in the LUN rang table 38. Alternatively, the storage management computing device 12 can instruct the bridge device 14 to use an updated LUN range for one or more of the SAS ports 32(1)-32(n).

Irrespective of the manner by which the storage management computing device 12 obtains the LUN ranges and corresponding SAS ports 32(1)-32(n) of the bridge device 14, the LUN range table 44 is initialized and maintained to correspond with the LUN ranges that are stored and used by the bridge device 14 for allocation to the storage devices 24(1)-24(n) and 26(1)-26(n), as described and illustrated in more detail later. In some examples, one or more of the LUN ranges associated with one or more of the SAS ports 32(1)-32(n) includes a same number of LUNs, although one or more of the LUN ranges can also includes a different number of LUNs than one or more other of the LUN ranges.

Optionally, one or more of the LUN ranges can establish, updated, and/or maintained to accommodate insertion and removal of one or more of the storage devices 24(1)-24 (n) and 26(1)-26(n). In some storage networks, a failed one of the storage devices 24(1)-24(n) or 26(1)-26(n) is given a time period (e.g., 30 seconds) to come back online to accommodate for a toggling of the power supply or other brief interruption, for example. During the time period, another one of the storage devices 24(1)-24(n) or 26(1)-26 (n) may be brought online, but is not allocated the LUN of the failed one of the storage devices 24(1)-24(n) or 26(1)-26(n) since the failed one of the storage devices 24(1)-24(n) or 26(1)-26(n) may come back online.

Instead, the newly initialized one of the storage devices 24(1)-24(n) or 26(1)-26(n) is allocated an unused LUN in the associated LUN range for the corresponding one of the SAS ports 32(1)-32(n). Accordingly, the LUN ranges are optionally larger than (e.g., double) the number of storage devices 24(1)-24(n) and 26(1)-26(n) that may be coupled to one of the SAS ports 32(1)-32(n) based on the capabilities of the operating system of the storage management computing device 12, or other constraint in the storage network 10 for example.

In step 302, the storage management computing device 12 receives a request from one of the client devices 20(1)-20(n) to perform a storage operation. For example, one of the client devices 20(1)-20(n) can request to read or write data stored by one or more of the storage devices 24(1)-24(n) or 26(1)-26(n), although other storage operations can also be used.

In step 304, the storage management computing device 12 processes the request received in step 302 by communicating with the bridge device 14 via the FC link 18. Accordingly, the storage management computing device 12 determines a LUN that is associated with one of the storage devices 24(1)-24(n) or 26(1)-26(n) for which access is required in order to service the storage operation. The LUN is optionally maintained in the active LUN table 46 and the storage management computing device 12 includes the LUN in the communication sent to the bridge device 14 via the FC link 18 and FC port 16. In some examples, the storage management computing device 12 may receive a communication in response from the bridge device 12, such as a confirmation of the performance of the storage operation or data that was requested, for example.

In step 306, the storage management computing device 12 determines whether a connect message is received from the bridge device 14, such as via the FC link 18. The connect message is a reporting message from the bridge device 14 that one of the storage devices 24(1)-24(n) or 26(1)-26(n) has connected and is now available for providing storage functionality.

In this example, the connect message includes a LUN allocated to the newly-connected one of the storage devices 24(1)-24(n) or 26(1)-26(n). The connect message can be sent by the bridge device 14, as described and illustrated in more detail later with reference to step 410 of FIG. 4, for example. If the storage management computing device 12 determines that a connect message has been received from the bridge device 14, then the Yes branch is taken to step 308.

In step 308, the storage management computing device 12 stores the LUN identified in the connect message in the active LUN table 46, although the LUN can be stored or maintained in other ways by the storage management computing device 12. Accordingly, the operating system of the storage management computing device 12 is now able to use the newly-connected one of the storage device 24(1)-24(n) or 26(1)-26(n) for storage functions based on the stored LUN. Subsequent to storing the LUN, or if the storage management computing device 12 determines in step 306 that a connect message is not received from the bridge device 14 and the No branch is taken, the storage management computing device 12 proceeds to step 310.

In step 310, the storage management computing device 12 determines whether a disconnect message is received from the bridge device 14, such as via the FC link 18. The disconnect message is a reporting message from the bridge device 14 that one of the storage devices 24(1)-24(n) or 26(1)-26(n) has disconnected and is no longer available for providing storage functionality. The disconnect of the one of the storage devices 24(1)-24(n) or 26(1)-26(n) can be a result of a failure or a rescaling of a storage device array, for example, although the disconnect can also result from other activity.

In this example, the disconnect message includes a LUN previously allocated to the disconnected one of the storage devices 24(1)-24(n) or 26(1)-26(n). The disconnect message can be sent by the bridge device 14, as described and illustrated in more detail later with reference to step 414 of FIG. 4, for example. If the storage management computing device 12 determines that a disconnect message has been received from the bridge device 14, then the Yes branch is taken to step 312.

In step 312, the storage management computing device 12 removes the LUN identified in the disconnect message from the active LUN table 46, for example, so that it is not used going forward by the operating system of the storage management computing device 12 to service storage operations. Optionally, the storage operation system of the storage management computing device 12 will use a LUN of a partner node in a high availability configuration in order to service storage requests relating to the data stored on the failed one of the storage devices 24(1)-24(n) or 26(1)-26(n).

In step 314 in this particular example, the storage management computing device 12 identifies one of the SAS ports 32(1)-32(n) of the bridge device 14 based on the LUN range table 44 and the LUN included in the disconnect message. Accordingly, the failed one of the storage devices 24(1)-24(n) or 26(1)-26(n) is attached to the identified one of the SAS ports 32(1)-32(n) via inclusion in one of the stacks 22(1)-22(n) coupled to the one of the SAS ports 32(1)-32(n).

The storage management computing device 12 is able to identify the one of the SAS ports 32(1)-32(n) based on the LUN included in the disconnect message being within one of the LUN ranges in the LUN range table 44 that is associated with the one of the SAS ports 32(1)-32(n). Accordingly, the one of the SAS ports 32(1)-32(n) can advantageously be determined by the storage management computing device 12 based on the pre-configuration of the LUN ranges corresponding to the SAS ports 32(1)-32(n), as reflected in the LUN range table 44 in this example.

In step 316, the storage management computing device 12 initiates an action based on the one of the SAS ports 32(1)-32(n) identified in step 314. In this particular example, the one of the SAS ports 32(1)-32(n) is identified as a result of a failed one of the storage devices 24(1)-24(n). Accordingly, the action can include outputting to the administrator device 28 or to a technician an indication of the one of the SAS ports 32(1)-32(n) to which one of the stacks 22(1)-22(n) hosting the failed one of the storage devices 24(1)-24(n) or 26(1)-26(n) is coupled.

In examples in which the correspondence of the stacks 22(1)-22(n) with the SAS ports 32(1)-32(n) is obtained and stored in step 300, the storage management computing device 12 can also output an indication of the one of the stacks 22(1)-22(n) that hosts the failed one of the storage devices 24(1)-24(n) or 26(1)-26(n). Also optionally, the action in step 316 can include causing an LED to be illuminated on the failed one of the storage devices 24(1)-24(n) or 26(1)-26(n).

Accordingly, in this particular example, the storage management computing device 12 can provide a technician with an indication of one of the stacks 22(1)-22(n) hosting a failed one of the storage devices 24(1)-24(n) or 26(1)-26(n) having an associated LED illuminated, thereby facilitating more efficient response time and resolution of the failure. Since LUNs are assigned sequentially without regard for any LUN ranges or association with bridge device ports, prior storage management computing devices are unable to identify any bridge device port based on a LUN.

Moreover, the storage management computing device 12 in this example can receive multiple disconnect message that include LUNs and facilitate a determination of other failures, such as a cabling failure, for example. Since the storage management computing device 12 can determine that two or more LUNs are within a same LUN range corresponding to one of the SAS ports 32(1)-32(n) in the LUN range table 44, the storage management computing device 32 can identify a problem with one of the stacks 22(1)-22(n) much earlier, and taken an appropriate action in step 316. In contrast, prior storage management computing devices cannot determine from two or more LUNs whether failed storage devices associated with those LUNs are associated with a same port or associated stack.

While the particular examples described and illustrated earlier relate to failure of one or more of the storage devices 24(1)-24(n) or 26(1)-26(n), the ability of the storage management computing device 12 to identify one of the SAS ports 32(1)-32(n) of the bridge device 14 based on a LUN is advantageous in other contexts, and other actions can be initiated based on identifying one of the SAS ports 32(1)-32(n).

For example, the storage management computing device 12 can detect and report various types of configurations and/or configuration problems relatively easily, as well provide advanced graphical user interface (GUI) functionality for administrators, among other advantages of this technology.

Referring back to step 310, if the storage management computing device 12 determines that a disconnect message is not received, then the No branch is taken back to step 302. Accordingly, the storage management computing device 12 essentially receives and processes storage operation requests received from the client devices 20(1)-20(n) while waiting for a connect or disconnect message from the bridge device 14 in this example, although one or more of steps 300-316 can be performed concurrently or in a different order, and other steps can be performed by the storage management computing device 12 in other examples.

Figure 4:
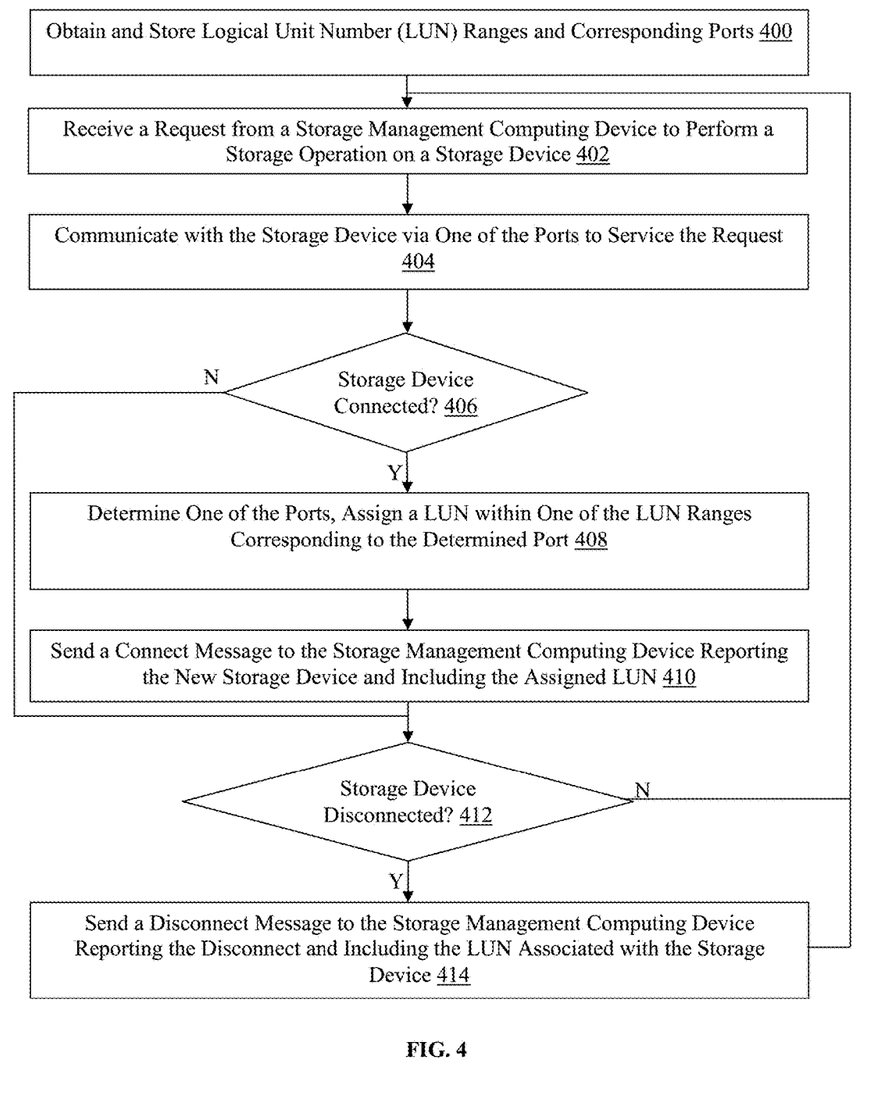
FIG. 4 is a flow diagram of an exemplary method for interfacing, by the exemplary bridge device of FIG. 1, with a storage management computing device to manage array LUNs in a storage network with a multi-path configuration.

Referring more specifically to FIG. 4, an exemplary method for interfacing, by the bridge device 14, with the storage management computing device 12 to manage array LUNs in the storage network 10 with the multi-path configuration of stacks 22(1)-22(n) is illustrated. In step 400, the bridge device 14 obtains LUN ranges and corresponding SAS ports 32(1)-32(n). The LUN ranges and correspondence of the LUN ranges with each of the SAS ports 32(1)-32(n) can be obtained as described and illustrated earlier with reference to step 300 of FIG. 3, and optionally stored in a LUN allocation table in the memory of the bridge device 14.

Accordingly, the LUN ranges can be pre-configured and stored in a non-volatile memory of the bridge device 14 by a manufacturer, static, dynamic, and/or include the same or different number of LUNs as one or more other of the LUN ranges, for example. Irrespective of the manner by which the bridge device 14 obtains the LUN ranges corresponding to each of the SAS ports 32(1)-32(n), the LUN ranges and corresponding SAS ports 32(1)-32(n) are initialized and maintained by the bridge device 14 to correspond to the contents of the LUN range table 44 of the storage management computing device 12.

In step 402, the bridge device 14 receives a request from the storage management computing device 12 to perform a storage operation on one of the storage devices 24(1)-24(n) or 26(1)-26(n). The storage operation can be a request to write data to one of the storage devices 24(1)-24(n) or 26(1)-26(n) or read data stored on one of the storage devices 24(1)-24(n) or 26(1)-26(n), for example. The request can be received via the FC link 18 and at the FC port 16.

In step 404, the bridge device 14 communicates with the one of the storage devices 24(1)-24(n) or 26(1)-26(n) via one of the SAS ports 32(1)-32(n) and one of the SAS links 34(1)-34(n) to service the request. Accordingly, the bridge device 14 can identify the one of the storage devices 24(1)-24(n) or 26(1)-26(n), as well as the one of the SAS ports 32(1)-32(n) and SAS links 34(1)-34(n) to use, based on a correspondence of the one of the storage devices 24(1)-24(n) or 26(1)-26(n) with a LUN included in the request. Optionally, the bridge device 14 can also send a confirmation message to the storage management computing device 12, requested data in the case of a read storage request, or any other type of message in response to the request received in step 402

In step 406, the bridge device 14 determines whether a new one of the storage devices 24(1)-24(n) or 26(1)-26(n) is connected or has come online. In some examples, the bridge device 14 can provision the new one of the storage devices 24(1)-24(n) or 26(1)-26(n) or the new one of the storage devices 24(1)-24(n) or 26(1)-26(n) can be inserted manually by a technician, for example, although other methods of instantiating the new one of the storage devices 24(1)-24(n) or 26(1)-26(n) can also be used.

Following connection with a shelf in one of the stacks 22(1)-22(n), the bridge device 14 can be configured to identify the new one of the storage devices 24(1)-24(n) or 26(1)-26(n), such as by a receive message indicating the connection, for example. Accordingly, if the bridge device 14 determines that a new one of the storage devices 24(1)-24(n) or 26(1)-26(n) is connected, then the Yes branch is taken to step 408.

In step 408, the bridge device 14 determines one of the SAS ports 32(1)-32(n) that is coupled to one of the stacks 22(1)-22(n) hosting the new one of the storage devices 24(1)-24(n) or 26(1)-26(n) and assigns a LUN within one of the LUN ranges corresponding to the determined one of the SAS ports 32(1)-32(n) to the new one of the storage devices 24(1)-24(n) or 26(1)-26(n). The bridge device 14 also stores an indication that the allocated LUN for the LUN range corresponding to the determined one of the SAS ports 32(1)-32(n) is currently used, such as in the LUN allocation table.

Accordingly, the LUN assignment by the bridge device 14 is within the LUN range allocated to each of the SAS ports 32(1)-32(n). Constraining all new LUN assignments within pre-configured LUN ranges for each SAS port 32(1)-32(n) allows the storage management computing device 12 to identify one of the SAS ports 32(1)-32(n) based on a provided LUN.

In step 410, the bridge device 14 sends a connect message to the storage management computing device 12 reporting the new one of the storage devices 24(1)-24(n) or 26(1)-26 (n) and including the assigned LUN. The connect message can be received by the storage management computing device, as described and illustrated in more detail earlier with reference to step 306 of FIG. 3, for example. Subsequent to sending the connect message, or if the bridge device 14 determines in step 406 that a new one of the storage devices 24(1)-24(n) or 26(1)-26(n) has not been connected and the No branch is taken, then the bridge device 14 proceeds to step 412.

In step 412, the bridge device determines whether one of the storage devices 24(1)-24(n) or 26(1)-26(n) has disconnected, such as due to a failure and expiration of a failure time period, for example, although the one of the storage devices 24(1)-24(n) or 26(1)-26(n) can be disconnected for any other reason. The bridge device 14 can determine that the one of the storage devices 24(1)-24(n) or 26(1)-26(n) based on polling, a received error message, or a message automatically communicated to the bridge device 14 upon disconnection of the one of the storage devices 24(1)-24(n) or 26(1)-26(n), for example, although the bridge device 14 can determine that the one of the storage devices 24(1)-24(n) or 26(1)-26(n) has disconnected in other manners. If the bridge device 14 determines that one of the storage devices 24(1)-24(n) or 26(1)-26(n) has disconnected, then the Yes branch is taken to step 414.

In step 414, the bridge device 14 sends a disconnect message to the storage management computing device 12 reporting the disconnection and including the LUN associated with the disconnected one of the storage devices 24(1)-24(n) or 26(1)-26(n). Optionally, the LUN number can be stored in the LUN allocation table as corresponding to a unique identifier of the one of the storage devices 24(1)-24(n) or 26(1)-26(n), for example, although the LUN number can be identified in other ways. Also optionally, the bridge device 14 can mark the LUN number in the LUN allocation table as available for reuse in examples in which LUN numbers are not assigned strictly in sequential order within the LUN ranges. The disconnect message can be received by the storage management computing device 12 as described and illustrated earlier with reference to step 310 of FIG. 3.

Subsequent to sending the disconnect message, or if the bridge device 14 determines in step 412 that one of the storage devices 24(1)-24(n) or 26(1)-26(n) has not disconnected and the No branch is taken, then the bridge device 14 proceeds back to step 402. Accordingly, the bridge device 14 receives, and communicates with the storage devices 24(1)-24(n) and 26(1)-26(n) to processes, storage operations requests received from the storage management computing device 12 while waiting for one of the storage devices 24(1)-24(n) or 26(1)-26(n) to connect or disconnect in this example, although one or more of steps 400-414 can be performed concurrently or in a different order, and other steps can be performed by the storage management computing device 12 in other examples.

Figure 5:
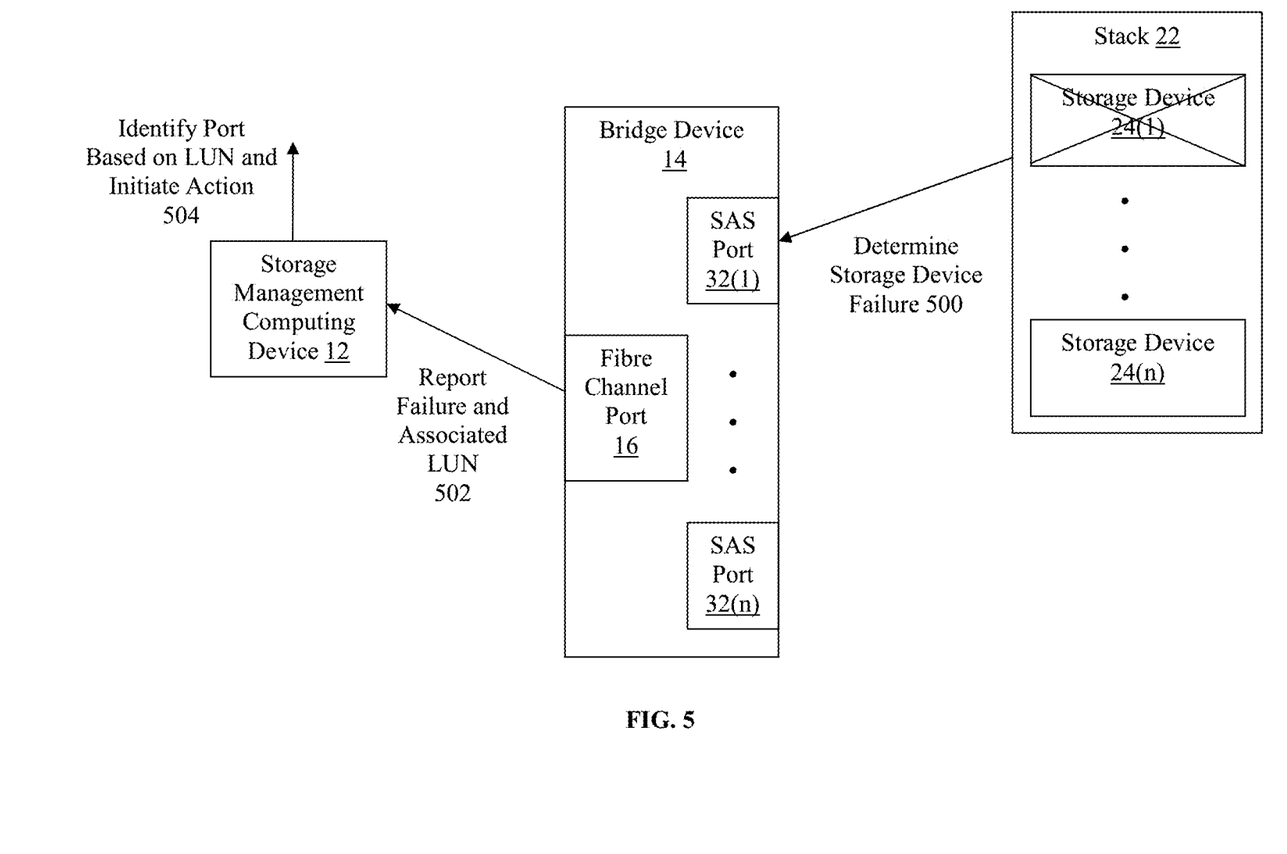
FIG. 5 is a flow diagram of an exemplary method for identifying a bridge device port in response to a storage device failure.

Referring more specifically to FIG. 5, a flow diagram of an exemplary method for identifying a bridge device port in response to a storage device failure is illustrated. In step 500, the bridge device 14 determines that the storage device 24(1) has failed, such as based on a message automatically sent by the storage device 24(1) upon failure for example. The storage device 24(1) in this particular example is hosted by stack 22(1), which is coupled to SAS port 32(1) of the bridge device 14.

In step 502, the bridge device 14 sends a disconnect message using the FC port 16 to report the failure of the storage device 24(1) to the storage management computing device 12 and includes the LUN associated with the storage device 24(1) in the disconnect message. The LUN was previously allocated to the storage device 24(1) by the bridge device 14 based on an unused LUN associated with the SAS port 32(1) and within a LUN range pre-configured for the SAS port 32(1).

In step 504, the storage management computing device 12 identifies the SAS port 32(1) based only on the LUN included in the disconnect message and initiates an action, such as outputting an indication of the identified SAS port 32(1) for example. The storage management computing device 12 in this example stores the same pre-configured LUN ranges corresponding to each of the SAS ports 32(1)-32(n) as maintained by the bridge device 14.

Accordingly, the storage management computing device 14 compares the LUN in the disconnect message to the stored LUN ranges, and identifies the SAS port corresponding to the LUN range that includes the LUN included in the disconnect message, which is SAS port 32(1) in this example. Optionally, the storage management computing device 12 is also configured, such as by an administrator, to store a correspondence of the SAS port 32(1) and the stack 22, and the storage management computing device 12 can also output an indication of that stack 22 as part of the initiated action in step 504. Therefore, the storage management computing device 12 can advantageously direct an administrator or technician to the stack 22 that hosts the failed storage device 24(1) in this particular example based on the LUN number communicated from the bridge device 14.

With this technology, a storage management computing device is able to determine the location of an array LUN using an established correspondence of LUN ranges and ports of a bridge device, irrespective of the order in which storage devices are detected, removed, or inserted into stacks in a storage network. With this technology, LUNs are assigned within ranges based on the bridge device port coupled to a stack hosting the storage devices, in contrast to the conventional and well-understood method of assigning LUNs to storage devices sequentially without regard for any LUN ranges or bridge device ports. Accordingly, this technology advantageously facilitates more effective and efficient detection and reporting of storage network configurations and configuration problems.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
receiving, by a computing device and via a link to a first port of a bridge device, a logical unit number (LUN) associated with a storage device that has disconnected;
identifying, by the computing device, a second port of the bridge device, to which a stack comprising the storage device that has disconnected is attached, based on inclusion of the LUN in a stored LUN range allocated for the second port; and
outputting, by the computing device, an indication of the stack based on a stored correspondence of the stack with the identified second port to facilitate locating the storage device that has disconnected.

2. The method of claim 1, wherein the second port of the bridge device, to which the stack is attached, is a Serial Attached Small Computer System Interface (SCSI) (SAS) port, the first port of the bridge device is a Fibre Channel (FC) port, and the link is an FC link.

3. The method of claim 1, further comprising obtaining, by the computing device, the correspondence of the stack with the second port.

4. The method of claim 1, further comprising receiving, by the computing device, a disconnect message comprising the LUN from the bridge device.

5. The method of claim 1, wherein the LUN range allocated for the second port of the bridge device attached to the stack comprises a number of LUNs that is larger than another number of storage devices capable of being coupled to the second port via the stack.

6. The method of claim 1, wherein the LUN range is static.

7. A non-transitory machine readable medium having stored thereon instructions for managing array LUNs in a storage network with a multi-path configuration comprising machine executable code which when executed by at least one machine causes the machine to:
receive, via a link to a first port of a bridge device, a logical unit number (LUN) associated with a storage device that has disconnected;
identify a second port of the bridge device, to which a stack comprising the storage device that has disconnected is attached, based on inclusion of the LUN in a stored LUN range allocated for the second port; and
output an indication of the stack based on a stored correspondence of the stack with the identified second port to facilitate locating the storage device that has disconnected.

8. The non-transitory machine readable medium of claim 7, wherein the second port of the bridge device, to which the stack is attached, is a Serial Attached Small Computer System Interface (SCSI) (SAS) port, the first port of the bridge device is a Fibre Channel (FC) port, and the link is an FC link.

9. The non-transitory machine readable medium of claim 7, wherein the machine executable code when executed by the machine further causes the machine to obtain the correspondence of the stack with the second port.

10. The non-transitory machine readable medium of claim 7, wherein the machine executable code when executed by the machine further causes the machine to receive a disconnect message comprising the LUN from the bridge device.

11. The non-transitory machine readable medium of claim 7, wherein the LUN range allocated for the second port of the bridge device attached to the stack comprises a number of LUNs that is larger than another number of storage devices capable of being coupled to the second port via the stack.

12. The non-transitory machine readable medium of claim 7, wherein the LUN range is static.

13. A computing device comprising:
a memory containing machine readable medium comprising machine executable code having stored thereon instructions for managing array LUNs in a storage network with a multi-path configuration; and
a processor coupled to the memory, the processor configured to execute the machine executable code to cause the processor to:
receive, via a link to a first port of a bridge device, a logical unit number (LUN) associated with a storage device that has disconnected;
identify a second port of the bridge device, to which a stack comprising the storage device that has disconnected is attached, based on inclusion of the LUN in a stored LUN range allocated for the second port; and
output an indication of the stack based on a stored correspondence of the stack with the identified second port to facilitate locating the storage device that has disconnected.

14. The computing device of claim 13, wherein the second port of the bridge device, to which the stack is attached, is a Serial Attached Small Computer System Interface (SCSI) (SAS) port, the first port of the bridge device is a Fibre Channel (FC) port, and the link is an FC link.

15. The computing device of claim 13, wherein the processor is further configured to execute the machine executable code to further cause the processor to obtain the correspondence of the stack with the second port.

16. The computing device of claim 13, wherein the processor is further configured to execute the machine executable code to further cause the processor to receive a disconnect message comprising the LUN from the bridge device.

17. The computing device of claim 13, wherein the LUN range allocated for the second port of the bridge device attached to the stack comprises a number of LUNs that is larger than another number of storage devices capable of being coupled to the second port via the stack.

18. The computing device of claim 13, wherein the LUN range is static.

* * * * *